United States Patent
Chefalas et al.

(10) Patent No.: US 9,948,746 B2
(45) Date of Patent: Apr. 17, 2018

(54) REQUEST PROCESSING ACCORDING TO DEGRADATION MONITORING

(71) Applicant: International Business Machines Corporation, Armonk, NY (US)

(72) Inventors: Thomas E. Chefalas, Somers, NY (US); David M. Egle, Rochester, MN (US); Daniel L. Hiebert, Pine Island, MN (US); Dennis D. Jurgensen, Chapel Hill, NC (US); Arthur J. Meyer, III, Rochester, MN (US); Peter A. Singh, Miami, FL (US); David M. Schultz, Williston, VT (US)

(73) Assignee: International Business Machines Corporation, Armonk, NY (US)

(*) Notice: Subject to any disclaimer, the term of this patent is extended or adjusted under 35 U.S.C. 154(b) by 245 days.

(21) Appl. No.: 14/739,033

(22) Filed: Jun. 15, 2015

(65) Prior Publication Data
US 2016/0366243 A1    Dec. 15, 2016

(51) Int. Cl.
*G06F 15/173* (2006.01)
*H04L 29/08* (2006.01)
*H04L 12/24* (2006.01)

(52) U.S. Cl.
CPC .......... *H04L 67/32* (2013.01); *H04L 41/5025* (2013.01); *H04L 41/5035* (2013.01); *H04L 41/5041* (2013.01); *H04L 67/10* (2013.01)

(58) Field of Classification Search
CPC .... G06F 9/4843; G06F 9/4881; G06F 9/5066; G06F 9/52; H04L 41/5025; H04L 41/5035; H04L 41/5041; H04L 67/10; H04L 67/32
See application file for complete search history.

(56) References Cited

U.S. PATENT DOCUMENTS 8,171,115 B2 * 5/2012 Hamilton .............. G06F 9/5011
                                                709/208
8,261,295 B1   9/2012 Risbood et al.
(Continued)

OTHER PUBLICATIONS

Lawson B.G., Smirni E. (2002) Multiple-Queue Backfilling Scheduling with Priorities and Reservations for Parallel Systems. In: Feitelson D.G., Rudolph L., Schwiegelshohn U. (eds) Job Scheduling Strategies for Parallel Processing. JSSPP 2002. Lecture Notes in Computer Science, vol. 2537, pp. 72-87. Springer, Berlin, Heidelberg.*

(Continued)

*Primary Examiner* — Christopher Biagini
(74) *Attorney, Agent, or Firm* — Edward J. Wixted, III

(57) ABSTRACT

In an approach for adjusting an order of actions to process a request, a processor receives a request that includes a set of actions to be performed in a first order. A processor receives monitored information of a service utilized to perform at least one action of the set of actions. A processor compares the monitored information to previously stored information. A processor determines that at least one aspect of the service is experiencing decreased performance based on the comparison. A processor identifies a first action of the set of actions corresponding to the at least one aspect of the service experiencing decreased performance. A processor adjusts the request, such that the request includes the set of actions to be performed in a second order, wherein the second order includes the first action is in a different position. A processor causes the adjusted request to be processed.

15 Claims, 5 Drawing Sheets

(56) References Cited

U.S. PATENT DOCUMENTS

| | | | |
|---|---|---|---|
| 9,021,490 B2* | 4/2015 | Marchand | G06F 9/4881 718/104 |
| 2005/0010608 A1* | 1/2005 | Horikawa | G06F 9/4862 |
| 2009/0282411 A1* | 11/2009 | Carteri | G06F 9/5038 718/102 |
| 2012/0054756 A1* | 3/2012 | Arnold | G06F 9/4881 718/102 |
| 2013/0232463 A1 | 9/2013 | Nagaraja et al. | |
| 2014/0068621 A1* | 3/2014 | Sitaraman | G06F 9/505 718/102 |
| 2014/0351820 A1* | 11/2014 | Lee | G06F 9/4881 718/103 |

OTHER PUBLICATIONS

Lee, Young Choon; Zomaya, Albert Y. "Stretch Out and Compact: Workflow Scheduling with Resource Abundance." 2013 13th IEEE/ACM International Symposium on Cluster, Cloud, and Grid Computing, pp. 219-226.*

"IBM Cloud Managed Services"; IBM; Printed May 29, 2015; pp. 1-2 <http://www.ibm.com/cloud-computing/us/en/products/ibm-cloud-managed-services.html>.

Mell et al., "The NIST Definition of Cloud Computing", Recommendations of the National Institute of Standards and Technology, Special Publication 800-145, Sep. 2011, 7 pages.

* cited by examiner

REQUEST PROCESSING ACCORDING TO DEGRADATION MONITORING

BACKGROUND

The present invention relates generally to the field of request management, and more particularly to rearranging actions necessary to complete a request based on monitored information indicating performance degradation in a cloud environment.

Cloud computing involves application systems which are executed within the cloud and operated through internet enabled devices. Cloud computing is computing in which large groups of remote servers are networked to allow centralized data storage and online access to computer services or resources. Cloud networks can be classified as public, private, or a hybrid of the two. Cloud services within the cloud services are made available to users on demand via the Internet from a cloud computing provider's servers as opposed to being provided from an end user's personal servers. Cloud services are designed to provide easy, scalable access to applications, resources, and servers, and are fully managed by a cloud service provider. A cloud service provider can fluctuate in size based on the needs of its users and the resources of the cloud service provider.

Current requests to, for example, deploy resources in a cloud computing environment, generally include a serialized order of actions necessary to perform to process the request. When problems occur in various components or resources necessary to process actions of the request, processing the request can take extended periods of time.

US Patent Application Number 2013/0232463 A1 describes a "deployment system [that] enables a developer to customize a deployment plan generated according to a logical, multi-tier application blueprint for deploying multiple applications in a cloud infrastructure. (US Patent Application Number 2013/0232463 A1, Abstract).

SUMMARY

Aspects of an embodiment of the present invention disclose a method, computer program product, and computer system for adjusting an order of actions to process a request. A processor receives a first request, wherein the first request includes a set of actions to be performed in a first order. A processors receives a set of monitored information of a service utilized to perform at least one action of the set of actions. A processor compares the set of monitored information of the service to a set of previously stored information of the service. A processor determines that at least one aspect of the service is experiencing decreased performance based on, at least, the comparison of the set of monitored information to the set of previously stored information. A processor identifies a first action of the set of actions corresponding to the at least one aspect of the service experiencing decreased performance. A processor adjusts the first request, such that the first request includes the set of actions to be performed in a second order, wherein the second order includes, at least, the first action is in a different position than in the first order. A processor causes the adjusted first request to be processed.

Embodiments of the present invention provide an approach for processing a request within a cloud environment based on monitored information and historically monitored information of the services, resources, and/or components necessary to process the request.

Additional embodiments of the present invention may disclose that the first request specifies infrastructure that is provided as a service. An embodiment in which the request specifies infrastructure that is provided as a service in a cloud environment has the advantage of enabling the provisioning and deployment of cloud resources to users of the cloud computing environment in a more efficient manner. Additional embodiments of the present invention may disclose a second action of the set of actions that cannot be executed until at least the first action has been executed, wherein the second order further includes the second action in a position within the second order such that the first action queues to execute prior to the second action. An embodiment in which there is a first action and a second action, and it is determined that the second action cannot be executed until the first action has been executed, and thus, the adjusted order includes the second action after the first action has the advantage of preserving dependencies and removing the possibility of attempting to perform actions that rely upon, as of yet, unexecuted actions. Additional embodiments of the present invention may disclose a second request including at least a second action corresponding to the at least one aspect of the service experiencing decreased performance, wherein the second request is adjusted such that the second action queues to execute at a different time than the first action. An embodiment in which there are multiple requests, and similar actions within each request are caused to execute at different times has the advantage of potentially alleviating strain on various services, resources, or components necessary to perform certain actions, by spreading out similar actions across the various services, resources, or components.

DETAILED DESCRIPTION

Figure 1:
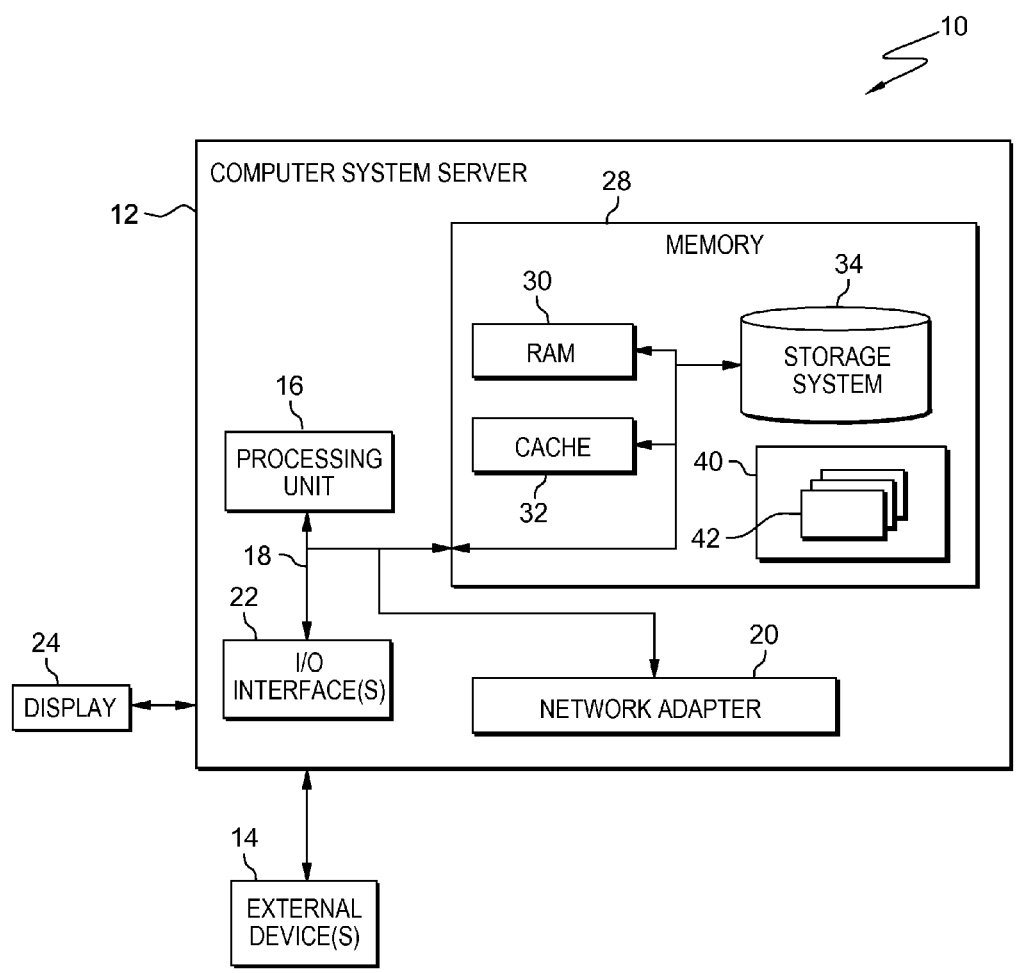
FIG. 1 depicts a cloud computing node according to an embodiment of the present invention.

Embodiments of the present invention recognize that, in cloud computing, a variety of requests may utilize different services, resources, or components of the cloud. Embodiments of the present invention recognize that, at times, certain services or other components may experience performance degradation, errors, downtime, or other issues that could result in a slowdown or halt of processing one or more actions necessary to complete the request. Embodiments of the present invention recognize that such issues may result in completion of the request taking longer than expected. As such, embodiments of the present invention provide an approach for processing a request within a cloud environment based on monitored information and historically monitored information of the services, resources, and/or components necessary to process the request.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
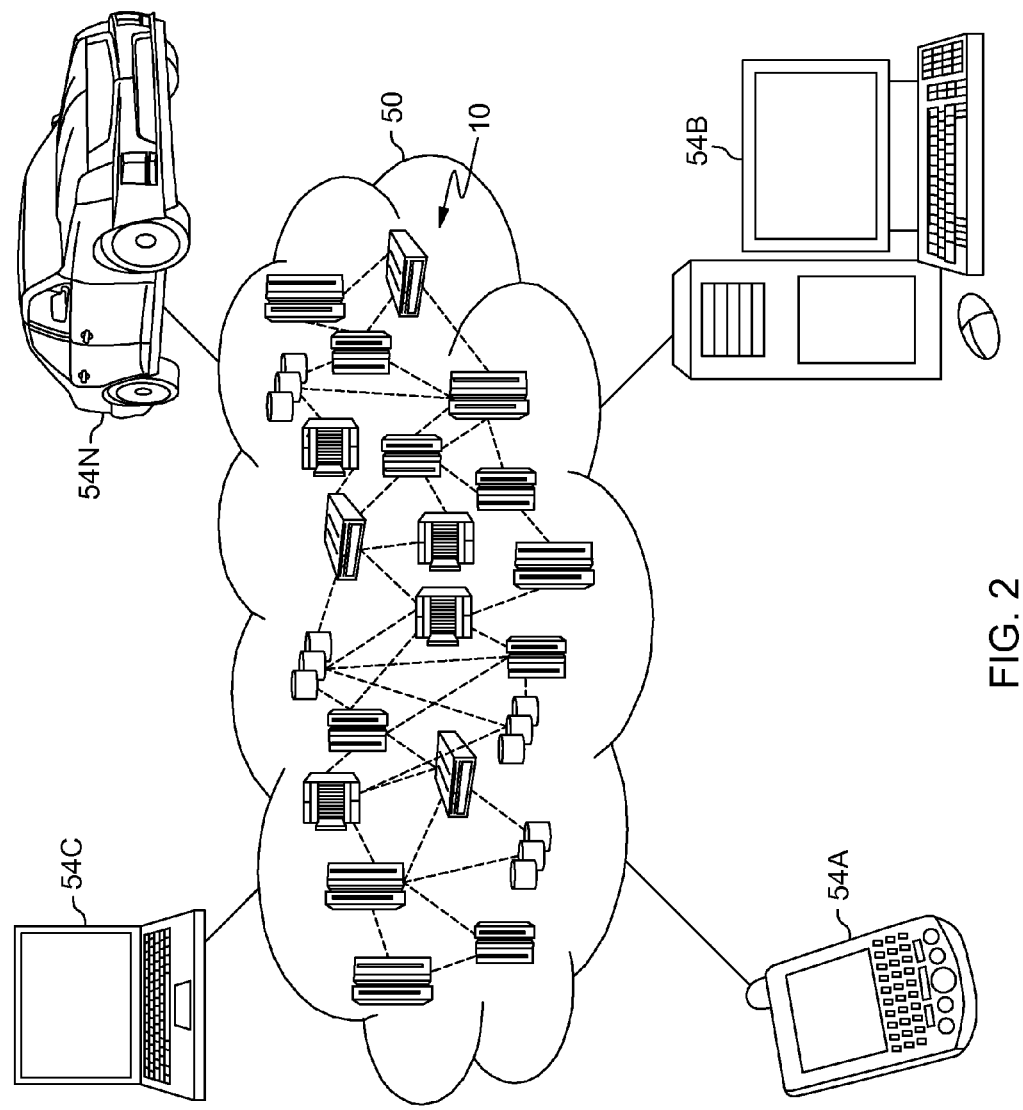
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
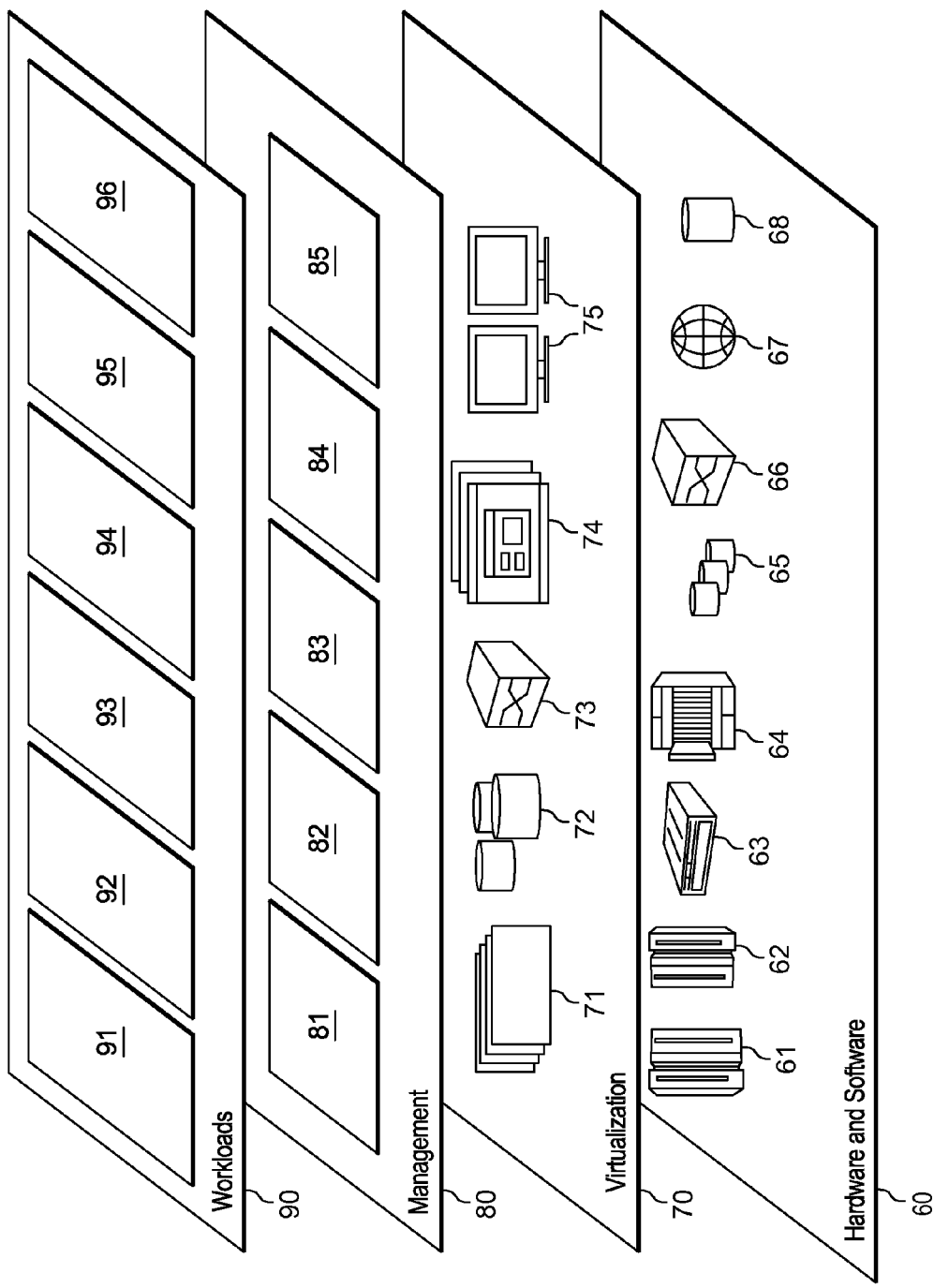
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 4:
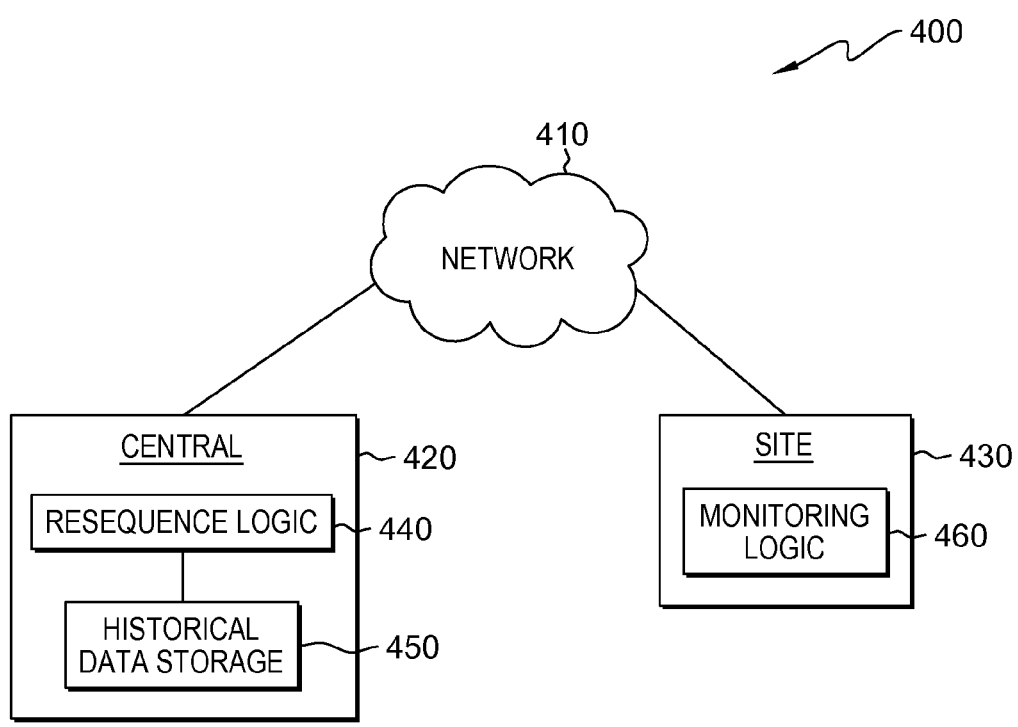
FIG. 4 depicts a diagram of a cloud computing environment according to an embodiment of the present invention.

FIG. 4 depicts a diagram of cloud computing environment 400. Cloud computing environment 400 is one example of an architecture of cloud computing environment 50, as described in reference to FIG. 2. FIG. 4 provides only an illustration of one embodiment, and does not imply any limitations with regard to the environments in which different embodiments may be implemented.

In the depicted embodiment, cloud computing environment 400 includes central 420 and site 430 interconnected over network 410. Network 410 may be a local area network (LAN), a wide area network (WAN) such as the Internet, any combination thereof, or any combination of connections and protocols that will support communications between central 420 and site 430, in accordance with embodiments of the invention. Network 410 may include wired, wireless, or fiber optic connections. Cloud computing environment 400 may include additional computing devices, servers, computers, mobile devices, or other devices not shown.

Central 420, in the example embodiment depicted in FIG. 4, is a central managing hub that manages multiple distributed sites in different geographies and locations, for example, site 430. Central 420 acts as a portal for clients attempting to access and create requests to, for example, commission or decommission virtual machines (VMs). Central 420 may include a catalog of services, and may perform other tasks and services to manage sites (e.g., site 430), and provide central support to client computing devices accessing services of cloud computing environment 400. Central 420 may be a management server, a web server, or any other electronic device or computing system capable of receiving and sending data. In some embodiments, central 420 may be a laptop computer, tablet computer, netbook computer, personal computer (PC), a desktop computer, or any programmable electronic device capable of communicating with site 430 via network 410. In some embodiments, central 420 may represent a server computing system utilizing multiple computers as a server system. In some embodiments, central 420 represents a computing system utilizing clustered computers and components to act as a single pool of seamless resources. In the depicted embodiment, central 420 contains resequence logic 440 and historical data storage 450.

Site 430, in the example embodiment depicted in FIG. 4, is one of potentially multiple sites, distributed across different geographies and locations, that is managed by central 420. As used herein, site 430 refers to a single site, among potentially many sites, managed by central 420. However, as described herein, the processes performed may be applicable to any site managed by central 420. Site 430 includes tools that are used to manage resources across multiple points of deliver (PoDs) (not shown). For example, site 430 may include tools to control services such as provisioning, patching, service activation and deactivation, asset collection health-checking, etc. Site 430 may include one or more managed backend servers (not shown) to assist in patching, monitoring, backing up, activating/deactivating services, etc. Site 430 may be a management server, a web server, or any other electronic device or computing system capable of receiving and sending data. In some embodiments, site 430 may be a laptop computer, tablet computer, netbook computer, personal computer (PC), a desktop computer, or any programmable electronic device capable of communicating with central 420 via network 410. In some embodiments, site 430 may represent a server computing system utilizing multiple computers as a server system. In some embodiments, site 430 represents a computing system utilizing clustered computers and components to act as a single pool of seamless resources. In the depicted embodiment, site 430 contains monitoring logic 460.

Monitoring logic 460 operates to monitor site 430 and provide monitored information about site 430 to resequence logic 440 or store monitored information about site 430 to historical data storage 450, for access by resequence logic 440. Monitoring logic 460 may monitor information from site 430 such as, for example, lengths of time to perform various services (e.g., monitor, patch, backup, activate/deactivate service), bandwidth across particular components within a site, component availability (e.g., server down), reported errors, or other information. In some embodiments, monitoring logic 460 periodically stores monitored information about site 430 to historical data storage 450. In other embodiments, monitoring logic 460 may, at the request of resequence logic 440, forward monitored information to resequence logic 440. In one embodiment, monitoring logic 460 resides at site 430. In other embodiments, monitoring logic 460 may reside on another server, another computing device, or at central 420, provided monitoring logic 460 has access to historical data storage 450 and provided monitoring logic 460 is capable of monitoring aspects of site 430.

Resequence logic 440 operates to receive a request that includes multiple actions and, in response to determining that monitored information indicates performance degradation for at least one of the multiple actions, adjust the order of the actions of the request. Upon reordering the multiple actions of the request, resequence logic 440 may cause a site, such as site 430, to execute the actions of the request according to the adjusted order. The received request may be, for example, a request to provision or deprovision a VM, and may also include one or more managed services such as, for example, patch, backup, backend server configuration, security, domain name service (DNS) registration, software installation, or other services. In one embodiment, resequence logic 440 resides at central 420. In other embodiments, resequence logic 440 may reside on another server, another computing device, or at site 430, provided resequence logic 440 has access to historical data storage 450.

Historical data storage 450 may be a repository that may be written to and read by resequence logic 440 and monitoring logic 460. Historical data for one or more sites (e.g., site 430) may be stored to historical data storage 450. Many types of historical data may be stored to historical data storage 450, and generally, data from each site is annotated or otherwise stored such that resequence logic 440 can identify to which site the data was gathered from. Historical data may include, for example, lengths of time to perform various services (e.g., monitor, patch, backup, activate/deactivate service), bandwidth across particular components within a site, component availability (e.g., server down), reported errors, or other information. In one embodiment, historical data storage 450 resides on central 420. In other embodiments, historical data storage 450 may reside on another server, another computing device, or site 430, provided that historical data storage 450 is accessible to resequence logic 440 and monitoring logic 460.

In an alternate embodiment, resequence logic 440 and historical data storage 450 are each located at site 430. In such an embodiment, central 420 may receive requests via a customer portal, and may forward the request or the actions associated with the request to site 430, where resequence logic 440 may operate to analyze the request and potentially rearrange the actions associated with the request based on relevant historical data gathered by monitoring logic 460 and stored to historical data storage 450.

One of skill in the art will recognize that cloud computing environment 400 is an example of but one organizational structure of a cloud computing environment, and as disclosed herein, cloud computing environment 400 does not imply any limitations with regard to the environments in which different embodiments may be implemented.

Figure 5:
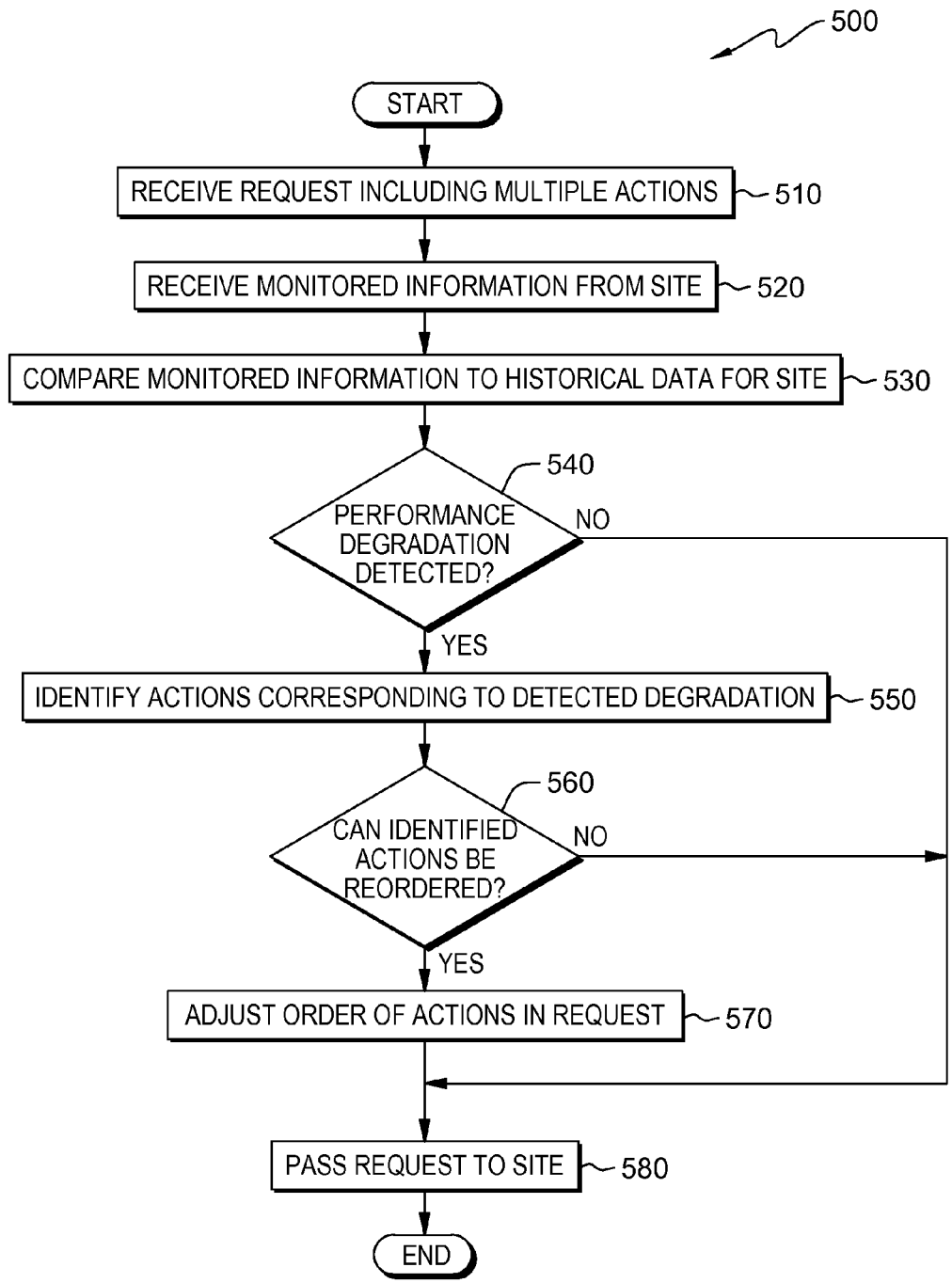
FIG. 5 depicts a flowchart of the steps of a resequence logic, for adjusting the order of actions necessary to complete a request based upon monitored information indicating performance degradation, executing within the cloud computing environment of FIG. 1, in accordance with an embodiment of the present invention.

FIG. 5 depicts flowchart 500 of the steps of resequence logic 440 executing within cloud computing environment 400 of FIG. 4, in accordance with an embodiment of the present invention. Resequence logic 440 operates to receive a request that includes multiple actions and, in response to determining that monitored information indicates performance degradation for at least one of the multiple actions, adjust the order of the actions of the request.

In one embodiment, initially, monitoring logic 460 monitors site 430 and stores monitored information to historical data storage 450. Information stored to historical data storage 450 may include information previously described. Along with the described information, monitoring logic 460 may store time-relevant information, such as a time stamp, and information indicating that the information was gathered from site 430. Site 430, and other sites, may include a variety of components and may not each be identical. Thus, each site may operate differently. In such embodiments, historical data for one site may not be relevant to historical data from another site.

After a period of time in which historical data is gathered by monitoring logic 460 and stored to historical data storage 450, a client at a client computing device (not shown) may access a portal located at central 420, and may create a request. Such a request may be, for example, a request to provision/deprovision a VM or a request for managed services. The request may include one or more actions. For example, if the request is a request to provision a VM, a series of actions may include deploy VM from a template, add security to the VM, DNS registration, install software, configure a backup, etc. A variety of actions may be included in each request. Some actions may have dependency preconditions indication that, for example, "action A" much be completed before "action B" can execute. Other actions may be independent, and while the request may specify an order, the specified order may not be the only acceptable order to accomplish the request.

In step 510, resequence logic 440 receives the request. Resequence logic 440 may receive the request from the customer portal of central 420 or via another program located on central 420. As described above, the request may include multiple actions that are to be performed in order to complete the request. In the embodiment described in FIG. 4, the actions of the request are to be performed by components of site 430. However, in other embodiments, actions may be performed at site 430, central 420, or on other servers, computing devices, and cloud computing nodes not shown. As described above, the request may be, for example, a request to deploy a VM, decommission a VM, adjust resources, install software, configure a backup, or a request to utilize other managed services capable of being provided by site 430.

In step 520, resequence logic 440 receives monitored information from site 430. In one embodiment, resequence logic 440 retrieves monitored information from historical data storage 450. In other embodiments, resequence logic 440 receives or retrieves monitored information from monitoring logic 460 at site 430. In some embodiments, the monitored information resequence logic 440 receives is monitored information from a recent time period (e.g., current, or recently monitored information). In some embodiments, resequence logic 440 selectively obtains monitored information about site 430, based on the actions included in the request. For example, resequence logic 440 may identify components or services of site 430 that may need to be utilized in order to perform the actions necessary to process the request. As such, resequence logic 440 may not require all of the information gathered by monitoring logic 460, and may selectively retrieve information relevant to processing the request.

In step 530, resequence logic 440 compares the received monitored information from site 430 (see step 520) to historical data for site 430. Resequence logic 440 may retrieve historical averages, or other data, from historical data storage 450 in order to compare metrics and identify whether there is a performance degradation in one or more components of site 430, or whether certain services provided by site 430 are operating poorly (e.g., high rate of errors, slow operation, etc.). For example, resequence logic 440 may identify that a backend server is experiencing high rates of usage (e.g., higher than normal bandwidth traffic), a server is down, that there are higher levels of errors being reported, or that the timing to accomplish certain actions may be slower than average. Such changes may indicate performance degradation for one or more actions that must be performed to complete the request.

In decision 540, resequence logic 440 determines whether performance degradation for one or more of the actions necessary to complete the request has been detected. Resequence logic 440 may determine whether performance degradation has been detected based upon the comparison of the monitored information and the historical data for site 430. In some embodiments, resequence logic 440 only determines whether performance degradation has been detected that is relevant to the completion of an action necessary to process the request. If resequence logic 440 determines that there is no relevant performance degradation detected (decision 540, no branch), and thus, site 430 should operate as expected to process the request, then resequence logic 440 passes the request to site 430 (see step 580). If resequence logic 440 determines that there is relevant performance degradation (decision 540, yes branch), resequence logic 440 identifies actions of the request that correspond to the detected performance degradations (see step 550).

In step 550, resequence logic 440 identifies actions of the request that correspond to detected performance degradations of site 430. In some embodiments, the request may indicate components or resources of site 430 necessary to process each action of the request. In other embodiments, historical data of historical data storage 450 may additional indicate servers, services, software, or other components necessary to accomplish each action. As such, resequence logic 440 may identify that one or more actions of the request correspond to an area of performance degradation within site 430.

In decision 560, resequence logic 440 determines whether the identified actions can be reordered. As described above, some actions of the request may include dependence preconditions. In other words, some actions of the request may be required to be performed after other actions. For example, software cannot be installed onto a VM until the VM is provisioned. As such, resequence logic 440 may determine that one or more actions that correspond to detected performance degradations of site 430 cannot be reordered. In some embodiments, the request may indicate dependence preconditions for each action. If resequence logic 440 determines that the identified actions cannot be reordered (decision 560, no branch), resequence logic 440 passes the request to site 430 (see step 580). If resequence logic 440 determines that at least one of the identified actions can be reordered (decision 560, yes branch), resequence logic 440 adjusts the order of actions of the request (see step 570).

In step 570, resequence logic 440 adjusts the order of the request. In general, resequence logic 440 adjusts the order of the request based on the identification of actions of the request corresponding to detected performance degradations (see step 550) and the determination that the identified actions of the request can be reordered (see decision 560). In some embodiments, resequence logic 440 may adjust the order such that actions of the request corresponding to detected performance degradations are completed later in the queue as compared to the order of the original request. Moving such an action down in the order of the request may allow more time for the necessary services, components or resources that are experiencing performance degradation to resolve. For example, an error handling tool (not shown) may operate to resolve issues in within site 430, and issues may be resolved before the latter actions of the request are due to execute. In some embodiments, the order may be adjusted such that actions not corresponding to detected performance degradations are moved up in the order, and thus, queued to occur earlier than specified in the original request. Similarly, embodiments of resequence logic 440 may further operate to identify a performance enhancement in one or more components of site 430, or whether certain services provided by site 430 are operating more efficiently than normal. Resequence logic 440 may make such a determination similarly to the determination as to whether or not performance degradation exists (see decision 540). For example, resequence logic 440 may identify that certain services or components are experiencing lower levels of traffic, quicker times to process certain actions, or other such comparisons. If resequence logic 440 has identified performance enhancements corresponding to an action, resequence logic 440 may reorder the request such that the action corresponding to the performance enhancements is moved up in the order, and thus is to be performed sooner than specified by the original request. In some embodiments, the request may be reordered such that an action may be run in parallel with one or more other actions of the request.

In step 580, resequence logic 440 passes, or sends, the request to site 430. If resequence logic 440 did not detect relevant performance degradation (see decision 540, no branch), or identified actions corresponding to the detected performance degradations were unable to be reordered (see decision 560, no branch), the request passed to site 430 is the originally received request. If resequence logic 440 was able to adjust the order of the request (see step 570), resequence logic 440 passes the adjusted request to site 430.

Upon receiving the request, either the original request or the adjusted request, site 430 causes the actions of the request to be processed according to the order specified.

In an alternate embodiment, resequence logic 440 and historical data storage 450 are each located at site 430 and, upon receiving a request that includes multiple actions, a program or component of site 430 provides the request to resequence logic 440, such that resequence logic 440 can analyze the request and adjust the order of the request, as described in reference to the flowchart, and cause site 430 to process the altered order of the request. However, in such an embodiment, central 420 may be unaware of changes to the request, and such changes may be managed by each site (e.g., site 430) individually.

In another alternate embodiment, there may be multiple concurrent requests. In such an example, an embodiment of resequence logic 440 may manage each request based on information from all concurrent requests. In such an embodiment, resequence logic 440 may order each request such that actions included in multiple requests are spread out, so as to avoid simultaneous execution of the actions included in multiple requests at site 430. Spreading out the time at which actions included in multiple requests are executed may allow for an enhanced workload distribution and may prevent bottlenecking at particular services or components of site 430.

An embodiment in which the request specifies infrastructure that is provided as a service in a cloud environment has the advantage of enabling the provisioning and deployment of cloud resources to users of the cloud computing environment in a more efficient manner. An embodiment in which there is a first action and a second action, and it is determined that the second action cannot be executed until the first action has been executed, and thus, the adjusted order includes the second action after the first action has the advantage of preserving dependencies and removing the possibility of attempting to perform actions that rely upon, as of yet, unexecuted actions. An embodiment in which there are multiple requests, and similar actions within each request are caused to execute at different times has the advantage of potentially alleviating strain on various services, resources, or components necessary to perform certain actions, by spreading out similar actions across the various services, resources, or components.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for adjusting an order of actions to process a request, the method comprising:
   receiving a first request, at a computing device, wherein the first request includes a set of actions to be performed, with regard to a provisioned network-based resource, in a first order;
   selectively retrieving, by one or more processors, a set of monitored information of a computing resource, at a site external to the computing device, utilized to perform at least one action of the set of actions based on the set of actions to be performed of the first request;
   comparing, by one or more processors of the computing device, the set of monitored information of the computing resource to a set of previously stored information about the computing resource, wherein the set of monitored information and the set of previously stored information comprise: length of time to perform a service, bandwidth across particular components, component availability, and reported errors;
   determining, by one or more processors of the computing device, that at least one aspect of the computing resource is experiencing decreased performance based on, at least, the comparison of the set of monitored information to the set of previously stored information;

identifying, by one or more processors of the computing device, a first action of the set of actions corresponding to the at least one aspect of the computing resource experiencing decreased performance;

adjusting, by one or more processors of the computing device, the first request, such that the first request includes the set of actions to be performed in a second order, wherein the second order includes, at least, the first action is in a different position than in the first order; and causing, by one or more processors of the computing device, the adjusted first request to be processed, wherein the first action is processed by the computing resource at the site external to the computing device.

2. The method of claim 1, wherein the first request specifies infrastructure that is provided as a service in a cloud environment.

3. The method of claim 2, wherein receiving the first request comprises receiving the first request from a central computing site that includes, at least, a portal accessible by users of the cloud environment, and wherein causing the adjusted first request to be processed comprises executing, by one or more processors, each action of the adjusted request according to the second order.

4. The method of claim 1, wherein the first request is a request to deploy a virtual machine.

5. The method of claim 1, further comprising:
identifying, by one or more processors, a second action of the set of actions corresponding to the at least one aspect of the computing resource experiencing decreased performance;
determining, by one or more processors, that the second action cannot be executed until at least the first action has been executed; and
wherein the second order further includes, at least, the second action in a position within the second order such that the first action queues to execute prior to the second action.

6. The method of claim 1, further comprising:
receiving a second request including at least a second action, wherein the second action corresponds to the at least one aspect of the computing resource experiencing decreased performance;
adjusting, by one or more processors, the second request, such that the second action queues to execute at a different time than the first action.

7. A computer program product for adjusting an order of actions to process a request, the computer program product comprising:
one or more computer readable storage media and program instructions stored on the one or more computer readable storage media, the program instructions comprising:
program instructions to receive a first request at a computing device, wherein the first request includes a set of actions to be performed, with regard to a provisioned network-based resource, in a first order;
program instructions to selectively retrieve a set of monitored information of a computing resource, at a site external to the computing device, utilized to perform at least one action of the set of actions to be performed of the first request;
program instructions to compare, by the computing device, the set of monitored information of the computing resource to a set of previously stored information about the computing resource, wherein the set of monitored information and the set of previously stored information comprise: length of time to perform a service, bandwidth across particular components, component availability, and reported errors;
program instructions to determine, by the computing device, that at least one aspect of the computing resource is experiencing decreased performance based on, at least, the comparison of the set of monitored information to the set of previously stored information;
program instructions to identify, by the computing device, a first action of the set of actions corresponding to the at least one aspect of the computing resource experiencing decreased performance;
program instructions to adjust, by the computing device, the first request, such that the first request includes the set of actions to be performed in a second order, wherein the second order includes, at least, the first action is in a different position than in the first order; and
program instructions to cause, by the computing device, the adjusted first request to be processed, wherein the first action is processed by the computing resource at the site external to the computing device.

8. The computer program product of claim 7, wherein the first request specifies infrastructure that is provided as a service in a cloud environment.

9. The computer program product of claim 8, wherein program instructions to receive the first request comprise program instructions to receive the first request from a central computing site that includes, at least, a portal accessible by users of the cloud environment, and wherein program instructions to cause the adjusted first request to be processed comprise program instructions to execute each action of the adjusted request according to the second order.

10. The computer program product of claim 7, wherein the first request is a request to deploy a virtual machine.

11. The computer program product of claim 7, further comprising:
program instructions, stored on the one or more computer readable storage media, to identify a second action of the set of actions corresponding to the at least one aspect of the computing resource experiencing decreased performance;
program instructions, stored on the one or more computer readable storage media, to determine that the second action cannot be executed until at least the first action has been executed; and
wherein the second order further includes, at least, the second action in a position within the second order such that the first action queues to execute prior to the second action.

12. The computer program product of claim 7, further comprising:
program instructions, stored on the one or more computer readable storage media, to receive a second request including at least a second action, wherein the second action corresponds to the at least one aspect of the computing resource experiencing decreased performance;
program instructions, stored on the one or more computer readable storage media, to adjust the second request, such that the second action queues to execute at a different time than the first action.

13. A computer system for adjusting an order of actions to process a request, the computer system comprising:

one or more computer processors, one or more computer readable storage media, and program instructions stored on the one or more computer readable storage media for execution by at least one of the one or more processors, the program instructions comprising:

program instructions to receive a first request at a computing device, wherein the first request includes a set of actions to be performed, to deploy a virtual machine, in a first order, wherein the set of actions comprise: deploy the virtual machine from a template, add security to the virtual machine, domain name service registration, install software, and configure a backup of the virtual machine;

program instructions to selectively retrieve a set of monitored information of a computing resource, at a site external to the computing device, utilized to perform at least one action of the set of actions based on the set of actions to be performed of the first request;

program instructions to compare, by the computing device, the set of monitored information of the computing resource to a set of previously stored information about the computing resource, wherein the set of monitored information and the set of previously stored information comprise: length of time to perform a service, bandwidth across particular components, component availability, and reported errors;

program instructions to determine, by the computing device, that at least one aspect of the computing resource is experiencing decreased performance based on, at least, the comparison of the set of monitored information to the set of previously stored information;

program instructions to identify, by the computing device, a first action of the set of actions corresponding to the at least one aspect of the computing resource experiencing decreased performance;

program instructions, stored on the one or more computer readable storage media, to identify a second action of the set of actions corresponding to the at least one aspect of the computing resource experiencing decreased performance;

program instructions, stored on the one or more computer readable storage media, to determine that the second action cannot be executed until at least the first action has been executed;

program instructions to adjust, by the computing device, the first request, such that the first request includes the set of actions to be performed in a second order, wherein:
  the second order includes the first action in a different position than in the first order; and
  the second order further includes the second action in a position within the second order such that the first action queues to execute prior to the second action;

program instructions to cause, by the computing device, the adjusted first request to be processed, wherein the first action is processed by the computing resource at the site external to the computing device.

14. The computer program product of claim 13, wherein the first request specifies infrastructure that is provided as a service in a cloud environment.

15. The computer program product of claim 13, further comprising:
program instructions, stored on the one or more computer readable storage media for execution by at least one of the one or more processors, to receive a second request including at least a third action, wherein the third action corresponds to the at least one aspect of the computing resource experiencing decreased performance;

program instructions, stored on the one or more computer readable storage media for execution by at least one of the one or more processors, to adjust the second request, such that the third action queues to execute at a different time than the first action.

\* \* \* \* \*